Patented Sept. 11, 1934

1,973,602

UNITED STATES PATENT OFFICE 1,973,602

ELECTROLYTIC CONDENSER CONTAINING MONOETHANOLAMINE

Milton Bergstein, New York, N. Y., assignor to Micamold Radio Corporation, Brooklyn, N. Y., a corporation of New York No Drawing. Application December 10, 1932, Serial No. 646,742

5 Claims. (Cl. 175—315)

This invention relates to condensers of the type wherein an electrolytic film is maintained on the surface of armatures or electrodes, such as aluminum, and employing an electrolyte in the form of a heavy liquid.

I have discovered that an improved condenser of this type may be made by the use of monoethanolamine in combination with boric acid and glycol or similar substance, that is, carbon compounds having similarly orientated hydroxyl groups on adjacent carbon atoms.

As an example of the electrolyte I mix the following ingredients in the proportions indicated:—

| | Parts by weight |
|---|---|
| Monoethanolamine | 1 |
| Glycol | 5 |
| Boric acid | 5 |

In my copending application Ser. No. 538,400, filed May 18, 1931, I have described an electrolyte embodying triethanolamine, boric acid and a material such as sucrose, glycol or glycerol. Glycol is preferred in the present formula because paste containing it has a lower viscosity, lower power factor, and higher conductivity. I find that if ordinary sucrose is used as a polyhydroxyl compound caramelization is apt to take place. I accordingly prefer glycol.

It should be noted that the molecular weights given in the above specific example are approximately identical. Consequently in the ratio chosen nearly all the boric acid and glycol will unite to form glycoboric acid, about one-fifth of which compound is neutralized by the ethanolamine.

The above mixture is heated to boiling and the boiling continued to a temperature between 125° and 130° C. in order to drive off part of the water originally present and that liberated by the reactions in the electrolyte. The reaction produces glycoboric acid and monoethanolammonium glycoborate. When this temperature is reached, I then immerse therein the electrolytic condenser rolls of a type well known in the art and impregnate these rolls with the electrolyte. Instead of the ordinary type of roll, I may employ condenser rolls with scratched-brushed anodes and narrow cathodes as described in my copending application Ser. No. 623,925, filed July 22, 1932.

The condenser rolls so impregnated may be formed in the electrolyte so prepared in a manner well known to the art; i. e. by applying a high voltage to the condenser terminals through a resistor of sufficient magnitude. I find that I am able to form such condensers from a 510 volt D. C. line through a 5000 ohm resistor, for two condensers, up to a leakage of approximately 0.5–1.0 ma per condenser at 500 volts in approximately 24 hours or less. A condenser so formed has the capacity required and an extraordinarily low power factor. In fact I have obtained power factors in this way under 3%. The leakage characteristics of the condensers so formed are also satisfactory.

Although I have described above a ratio of 5 glycol to 1 monoethanolamine to 5 boric acid, a composition containing a smaller ratio of monoethanolamine may also be used but the resistance of the mass is thereby increased. Similarly a larger ratio of ethanolamine may be used but the formation time is thereby somewhat increased.

Although I have described specifically the use of monoethanolamine, I may incorporate some triethanolamine or some other highly substituted alcoholamine, such as in some instances being desirable since it yields a mass of higher viscosity. I have found in general that the use of monoethanolamine is desirable because monoethanolammonium ion is smaller than triethanolammonium ion and associates fewer ions with it in solution. Its ionic mobility consequently suffers but little change when the temperature is lowered and therefore change in temperature has but limited effect on the power factor and capacity. The condenser prepared with this electrolyte has improved shelf-life characteristics in addition to the lower power factor mentioned, better performance at low temperatures and lower formation time.

In the claims where the expression "glycol" is employed, it is to be understood that it includes glycerin and other equivalents therefor.

In the manufacture of condensers, if the electrolyte mass becomes inefficient because of the loss of too much water, water may be added thereto to bring it back to its original consistency.

I claim:

1. An electrolytic condenser of the class described having an armature of the film-forming type and an electrolyte of glycol, monoethanolamine and boric acid combined in the approximate ratio of 5 to 1 to 5 parts by weight.

2. An electrolytic condenser of the class described having an armature of the film-forming type and an electrolyte of monoethanolammonium glycoborate and glycoboric acid.

3. An electrolytic condenser of the class described having an armature of the film-forming type and an electrolyte which is the result of heating a mixture of glycol, monoethanolamine and boric acid.

4. An electrolytic condenser according to claim 3 in which the electrolyte contains in addition triethanolamine.

5. An electrolytic condenser of the class described having an armature of the film-forming type and an electrolyte consisting of glycol, boric acid and material to increase the viscosity thereof selected from the group monoethanolamine and triethanolamine.

MILTON BERGSTEIN.